(12) United States Patent
Hyun et al.

(10) Patent No.: US 11,539,789 B2
(45) Date of Patent: Dec. 27, 2022

(54) METHOD AND APPARATUS FOR RECOVERING MISSING DATA IN MULTI-SOURCE HYBRID OVERLAY NETWORK

(71) Applicant: ELECTRONICS AND TELECOMMUNICATIONS RESEARCH INSTITUTE, Daejeon (KR)

(72) Inventors: Wook Hyun, Sejong-si (KR); Mi Young Huh, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 171 days.

(21) Appl. No.: 17/185,413

(22) Filed: Feb. 25, 2021

(65) Prior Publication Data
US 2021/0314399 A1 Oct. 7, 2021

(30) Foreign Application Priority Data

Apr. 3, 2020 (KR) .................. 10-2020-0041012
Sep. 24, 2020 (KR) .................. 10-2020-0123507

(51) Int. Cl.
*G06F 15/173* (2006.01)
*H04L 67/1074* (2022.01)
(Continued)

(52) U.S. Cl.
CPC ...... *H04L 67/1078* (2013.01); *H04L 67/1095* (2013.01); *H04L 67/55* (2022.05); *H04L 67/568* (2022.05)

(58) Field of Classification Search
CPC ... H04L 67/1078; H04L 67/55; H04L 67/568; H04L 67/1095
See application file for complete search history.

(56) References Cited

U.S. PATENT DOCUMENTS 8,725,890 B2  5/2014  Liu et al.
2003/0126277 A1* 7/2003 Son .................... H04L 67/1091
709/231
(Continued)

FOREIGN PATENT DOCUMENTS

KR  10-2010-0123146  11/2010
KR  10-1664188      10/2016

OTHER PUBLICATIONS

Hoda Ayatollahi et al.; "A push pull network coding protocol for live peer-to-peer streaming"; Computer Networks 130 (2018) pp. 145-155.

(Continued)

*Primary Examiner* — Thanh T Nguyen
(74) *Attorney, Agent, or Firm* — Kile Park Reed & Houtteman PLLC

(57) ABSTRACT

In a multi-source hybrid overlay network including a plurality of peers, an apparatus that recovers missing data occurring in a tree recovery process, acquires data that a peer does not have in a pull method through exchanging buffer maps with a first counterpart peer connected to a primary path recovered in the tree recovery process and at least one second counterpart peer connected to at least one candidate path, and provides data that the first counterpart peer does not have to the first counterpart peer in the push method, when a data recovery policy is a pull method, is provided.

18 Claims, 11 Drawing Sheets

(51) Int. Cl.
*H04L 67/1095* (2022.01)
*H04L 67/55* (2022.01)
*H04L 67/568* (2022.01)

(56) References Cited

U.S. PATENT DOCUMENTS

| | | | |
|---|---|---|---|
| 2005/0050328 A1* | 3/2005 | Mizrah | H04L 9/0844 |
| | | | 713/171 |
| 2008/0317050 A1 | 12/2008 | Xiong et al. | |
| 2010/0098103 A1 | 4/2010 | Xiong et al. | |
| 2011/0087775 A1 | 4/2011 | Lee et al. | |
| 2011/0087915 A1 | 4/2011 | Zhang et al. | |
| 2015/0023342 A1 | 1/2015 | Joo | |
| 2016/0197731 A1* | 7/2016 | Hyun | H04L 63/061 |
| | | | 713/176 |
| 2018/0034873 A1 | 2/2018 | Brown et al. | |
| 2018/0367866 A1* | 12/2018 | Hyun | H04L 67/104 |
| 2021/0314399 A1* | 10/2021 | Hyun | H04L 67/55 |

OTHER PUBLICATIONS

Etri, "X.HP2P-Arch: Proposed Annex for data recovery", International Telecommunication Union, Telecommunication Standardization Sector, Study Period 2017-2020, Q8/11-DOC8 (200511), Study Group 11, English only, E-Meeting, May 11-May 15, 2020, pp. 1-9.

* cited by examiner

—— Primary path
◄----- Candidate path

— Primary path
◄----- Candidate path

METHOD AND APPARATUS FOR RECOVERING MISSING DATA IN MULTI-SOURCE HYBRID OVERLAY NETWORK

CROSS-REFERENCE TO RELATED APPLICATION

This application claims priority to and the benefit of Korean Patent Application No. 10-2020-0041012 filed in the Korean Intellectual Property Office on Apr. 3, 2020, and Korean Patent Application No. 10-2020-0123507 filed in the Korean Intellectual Property Office on Sep. 24, 2020, the entire contents of which are incorporated herein by reference.

BACKGROUND OF THE INVENTION

(a) Field of the Invention

The present invention relates to a method and apparatus for recovering missing data in a multi-source hybrid overlay network. More particular, the present invention relates to a method and apparatus for recovering missing data in a multi-source hybrid overlay network, in order to recover missing data occurred in a process of changing and reconfiguring of a tree topology according to entry and exit of peers included in the multi-source hybrid overlay network.

(b) Description of the Related Art

The hybrid overlay network refers to a peer-to-peer (P2P) overlay network that has both the characteristics of a mesh and a tree. In a hybrid overlay network, one peer can transmit and receive data through multiple paths by maintaining multiple connections at the same time according to the characteristics of the mesh, and can transfer data through peers in a short time by having a virtual hierarchy according to the characteristics of the tree.

The mesh method enables rapid distribution and reception of large files in a non-real time method, but may not be suitable for real-time data. The tree method can quickly propagate real-time data, but it is difficult to construct and maintain the tree. Furthermore, if a peer located in the middle of the tree disappears, there is a problem that many peers cannot receive data, and in most cases, it cannot provide a recovery function.

Existing technologies related to hybrid P2P networks only disclose the function of propagating from one source peer to multiple peers. In a multi-source hybrid P2P network in which multiple sources exist in one hybrid P2P network, unlike the existing overlay networks based on tree and mesh, any peers participating in the tree can be a data source. That is, data generated from one peer can be propagated to all other peers.

In addition, each peer participating in the hybrid P2P network has a plurality of primary paths and a plurality of candidate paths. The primary paths are mainly used as a path for broadcasting real-time data, and the candidate paths are used as a backup connection to recover as quickly as possible if the primary path fails.

In a multi-source hybrid P2P network, when one peer located in the middle disappears, the primary path is recovered using the candidate path. In the process of restoring the primary path, other peers can also generate their own data and transmit the generated data, respectively. However, peers located on both sides of the disappeared peer are divided into different segments, and data cannot be exchanged between the two segments.

Furthermore, the size and amount of data flowing through the hybrid overlay network are not fixed, and peers can only maintain data for a certain size and period, so it may be difficult for the peers to maintain all data until the connection between the two segments is recovered.

Therefore, the real-time data generated in the two segments during the process of recovery and reconfiguration of the tree must be recovered within a short time, and the data accumulated in the two segments must be exchanged between two segments.

SUMMARY OF THE INVENTION

The present invention has been made in an effort to provide a method and apparatus for recovering missing data in a multi-source hybrid overlay network capable of quickly recovering missing data in a process of recovering and reconfiguring a tree in a multi-source hybrid network.

According to an embodiment of the present invention, a method for recovering missing data occurring in a tree recovery process by a first peer in a multi-source hybrid overlay network including a plurality of peers is provided. The method for recovering missing data includes: receiving a data recovery policy of a push method; transmitting a buffer map of the first peer to a second peer for tree recovery; receiving a buffer map of the second peer from the second peer; comparing the buffer map of the first peer and the buffer map of the second peer; and transmitting a first broadcast message including data that the second peer does not have to the second peer.

The method for recovering missing data may further include receiving a second broadcast message including data that the first peer does not have from the second peer.

The method for recovering missing data may further include transmitting the second broadcast message to another third peer connected through a primary path.

The receiving of the second broadcast message may include copying data received through the second broadcast message to a cache buffer of the first peer, the cache buffer may have the form of a circular queue for each source peer identifier, and the copying may include storing the received data in a queue corresponding to a source peer identifier of the received data.

The transmitting of the buffer map of the first peer may include: selecting one of a plurality of candidate paths; and transmitting a primary path setting message for switching the selected candidate path to a primary path to the second peer to establish the primary path with the second peer, and the primary path setting message may include the buffer map of the first peer.

According to another embodiment of the present invention, a method for recovering missing data occurring in a tree recovery process by a first peer in a multi-source hybrid overlay network including a plurality of peers is provided. The method for recovering missing data includes: selecting one of a plurality of candidate paths, and transmitting a primary path setting message for switching the selected candidate path to a primary path to a second peer to establish the primary path with the second peer; transmitting data that the second peer does not have to the second peer in a push method; and acquiring data that the first peer does not have from at least one peer among the second peer and at least one third peer connected to the first peer through a candidate path in a pull method.

The acquiring data may include: transmitting a buffer map of the first peer to the second peer and the at least one third peer; receiving buffer maps of the second peer and the at least one third peer from the second peer and the at least one third peer; and requesting and receiving data that the first peer does not have to at least one peer among the second peer and at least one third peer by comparing the buffer map of the first peer with the buffer maps of the second peer and the at least one third peer.

The requesting and receiving may include: first requesting and receiving data that the first peer does not have to the at least one third peer among the second peer and the at least one third peer; and requesting and receiving data not acquired from the at least one third peer among data that the first peer does not have to the second peer.

The method for recovering missing data may further include: when data that the first peer does not have is received, checking whether the received data exists in the buffer map of the first peer; and when the received data does not exist in the buffer map of the first peer, transmitting a broadcast message including the received data to another peer connected through a primary path.

The transmitting of the broadcast message may include storing the received data in a cache buffer formed as a circular queue for each source peer identifier in response to the source peer identifier of the received data.

The establishing may include: first requesting and receiving data that the first peer does not have to the at least one third peer among the second peer and the at least one third peer; and requesting and receiving data not acquired from the at least one third peer among data that the first peer does not have to the second peer.

The method for recovering missing data may further include storing the received new data in a cache buffer formed as a circular queue for each source peer identifier in response to the source peer identifier of the received new data.

According to yet another embodiment of the present, an apparatus for recovering missing data occurring in a tree recovery process by a peer in a multi-source hybrid overlay network including a plurality of peers is provided. The apparatus for recovering missing data includes an interface for transmitting and receiving data, and a processor. The processor that is connected to the interface acquires data that the peer does not have in a pull method through exchanging buffer maps with a first counterpart peer connected to a primary path recovered in the tree recovery process and at least one second counterpart peer connected to at least one candidate path, and provides data that the first counterpart peer does not have to the first counterpart peer in the push method, when a data recovery policy is a pull method.

When the data recovery policy is a push method, the processor provides data that the first counterpart peer does not have through a comparison of its own buffer map and the buffer map of the first counterpart peer to the first counterpart peer, and receives data that the peer does not have from the first counterpart peer.

The apparatus for recovering missing data may further include a cache buffer that stores data, and the processor may transmit the acquired data to another peer connected through another primary path and store the acquire data in the cache buffer when the acquired data does not exist in the cache buffer.

The cache buffer may be formed in the form of a circular queue for each source peer identifier, and the processor may store the acquired data in a queue corresponding to a source peer identifier of the acquired data.

The cache buffer may sequentially delete from the oldest data when data larger than a predetermined size is stored, and delete data whose minimum maintain time has elapsed among stored data.

The processor may first request and acquire data that the peer does not have from the at least one second counterpart peer, and request and acquire data that is not acquired from the second counterpart peer among the data that the peer does not have to the first counterpart peer.

DETAILED DESCRIPTION OF THE EMBODIMENTS

Figure 1:
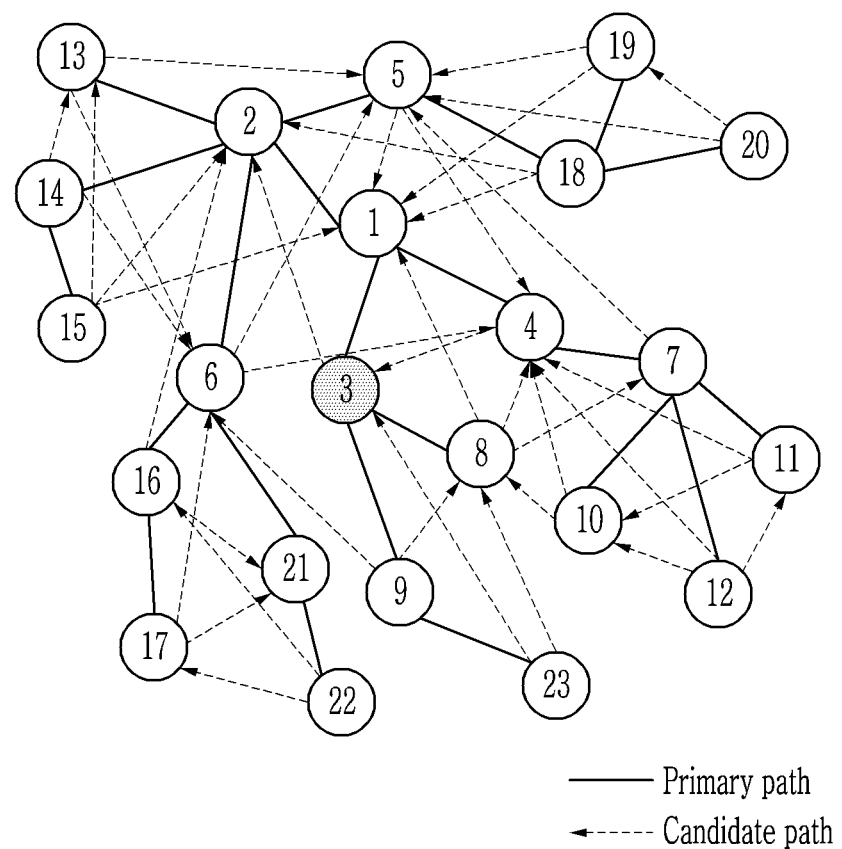
FIG. 1 is a diagram illustrating an example of a multi-source hybrid overlay network according to an embodiment of the present invention.

Hereinafter, embodiments of the present invention will be described in detail with reference to the attached drawings so that a person of ordinary skill in the art may easily implement the present invention. The present invention may be modified in various ways, and is not limited thereto. In the drawings, elements that are irrelevant to the description of the present invention are omitted for clarity of explanation, and like reference numerals designate like elements throughout the specification.

Throughout the specification and claims, when a part is referred to "include" a certain element, it means that it may further include other elements rather than exclude other elements, unless specifically indicated otherwise.

Hereinafter, a method and apparatus for recovering missing data in a multi-source hybrid overlay network according to embodiments of the present invention will be described in detail with reference to the accompanying drawings.

FIG. 1 is a diagram illustrating an example of a multi-source hybrid overlay network according to an embodiment of the present invention.

Referring to FIG. 1, a multi-source hybrid overlay network is a network in which the concept of an overlay network is combined with P2P technology. The multi-source hybrid overlay network includes a plurality of peers 1 to 23 connected to each other through a link.

Unlike the existing overlay networks based on tree and mesh, in the multi-source hybrid overlay network, the peers 1 to 23 participating in the tree may be as a data source. The peers 1 to 23 can generate data on their own and transmit the data through a tree.

Each of the peers 1 to 23 may have a primary path and a plurality of candidate paths when joining a multi-source hybrid overlay network. When the peers 1 to 23 initially join the multi-source hybrid overlay network, the peers 1 to 23 may select one primary path. Thereafter, when another peer joins the multi-source hybrid overlay network and connects to the primary path with the existing peers, respectively, the existing peers each have two primary paths. In this way, the peers 1 to 23 have a plurality of primary paths and a plurality of candidate paths, respectively. Real-time data is exchanged immediately on the main route. The candidate path is used for recovery when the tree is disconnected. Although data is not transmitted through the candidate path, candidate path may be partially used during data recovery of the pull method in the data recovery process. Each of the peers 1 to 23 may be connected to one or more other peers through primary paths, and may be connected to one or more other peers through candidate paths. For example, the peer 1 may be connected to the peers 2, 3, and 4 by primary paths, and may be connected to the peers 5, 7, 8, 15, 18, and 19 by candidate paths.

When the peers 1 to 23 participate in a multi-source hybrid overlay network, the peers 1 to 23 are allocated a ticket identifier (ticket-id) from a hybrid overlay management server (HOMS). The ticket-id is allocated from the HOMS whenever a new peer joins to the multi-source hybrid overlay network, and may be allocated a sequential number each time the peers join. In FIG. 1, reference numerals 1 to 23 may indicate ticket-id values of each peer. The value of the ticket-id can be used for tree recovery. The peers 1 to 23 do not perform a tree recovery operation when the primary path is disconnected due to the disappearance of a peer that is lower than the value of their ticket-id. However, the peers 1 to 23 do perform a tree recovery operation such as switching the candidate path to the primary path or retrying connection with the new peer by getting a new peer list from the HOMS when the primary path is disconnected due to the disappearance of the peer that is higher than the value of their ticket-id.

Figure 2:
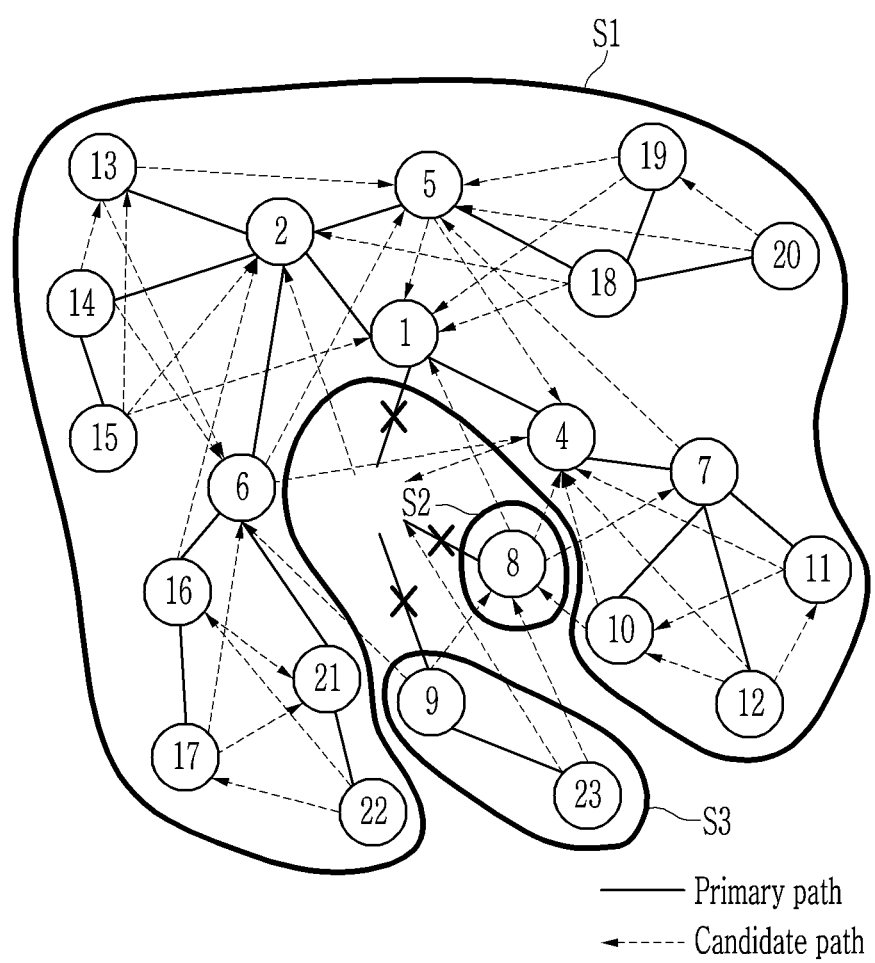
FIG. 2 is a diagram illustrating an example of a plurality of segments generated due to a tree disconnection in a multi-source hybrid overlay network in FIG. 1.
Figure 3:
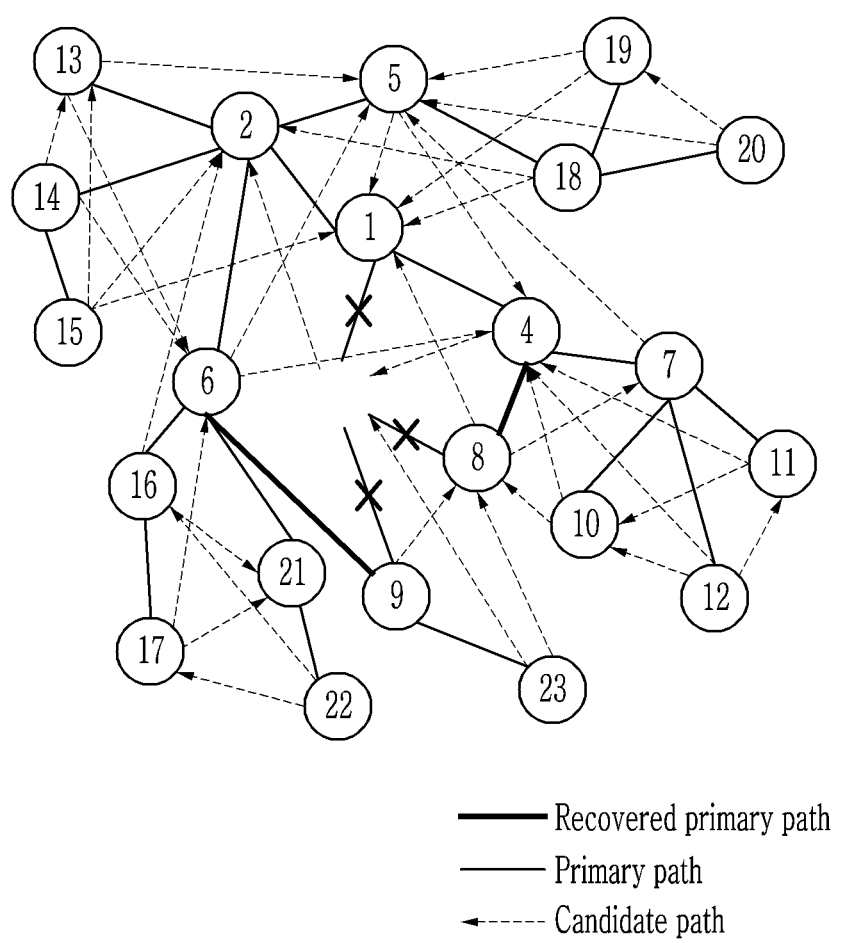
FIG. 3 is a diagram illustrating an example of a tree recovery process.

FIG. 2 is a diagram illustrating an example of a plurality of segments generated due to a tree disconnection in a multi-source hybrid overlay network in FIG. 1, and FIG. 3 is a diagram illustrating an example of a tree recovery process.

Referring to FIG. 2, when the peer 3 disappears in the multi-source hybrid overlay network shown in FIG. 1, the peers 1, 2, and 4 to 23 in the multi-source hybrid overlay network are divided into a plurality of segments S1, S2, and S3 due to tree disconnection.

The peer 1 having a lower ticket-id than peer 3 among peers 1, 8, and 9 connected through the primary path with peer 3 does not proceed with a recovery procedure. However, the peers 8 and 9 having higher ticket-id than peer 3 perform the recovery procedure.

As shown in FIG. 3, the peers 8 and 9 can recover the tree by switching the candidate paths they have to the primary path. In this case, if there is no candidate path, the peers 8 and 9 access the HOMS to get a new peer list, and set a plurality of candidate paths and a plurality of primary paths with a new peer in new peer list.

In this way, the tree topology may be changed according to the disconnection of the primary path between peers due to entry of peers into the multi-source hybrid network and exit of peers from the multi-source hybrid network. In the tree recovery process, each peer 1, 2, and 4 to 23 can generate and transmit data on its own, so peers 1, 2, 4 to 7, 10, and 22 of segment S1, peer 8 of segment S2, and peers 9 and 23 of segment S3 have different data, and data exchange between them becomes impossible. Also, even if the tree is recovered, there may be missing data between segments S1, S2, and S3.

An embodiment of the present invention provides a function of synchronizing data between segments by recovering missing data in a short time while a tree change occurs.

First, the multi-source overlay caching policy is designated when the hybrid overlay network is generated. When generating a new overlay network, an owner peer who wants to generate the new overlay network designates an overlay caching policy and an overlay recovery policy of the overlay network, and transmits the overlay caching policy and the overlay recovery policy of the overlay network to the HOMS. When new peers join the overlay network, the new peers receive the overlay caching policy and the overlay recovery policy from the HOMS, and the peers participating in the hybrid overlay network operate according to the overlay caching policy and the overlay recovery policy.

Parameters (mN_Cache and mD_Cache) are used in the overlay caching policy. The mN_Cache represents the minimum number of cached data sets. The mD_Cache represents the minimum maintain time of cached data. Peers include caching buffers. The caching buffer may have form of a circular queue. The size of the circular queue is set to be greater than the value of the mN_Cache. If the value of the mN_Cache is 0, it means that the circular queue is not maintained. That is, the data recovery function does not proceed. Since data that has already been delayed in time such as for multimedia streaming is not required, the value of the mN_Cache is set to 0 in this case. In addition, peers guarantee the minimum maintain time of each cached data set based on the value of the mN_Cache. The peers may delete the cached data if the condition is not satisfied regarding any of the values of the mN_Cache and mD_Cache, but may further maintain the cached data according to implementation and operation methods. For example, if the value of the mD_Cache is 10 minutes and the value of the mN_Cache is 100, assuming that the 101st packet arrived in the circular queue, even if the maintain time of the data to be deleted is less than 10 minutes, the data may be deleted in the circular queue. In addition, even if the maintain time of the data elapses for 15 minutes while there are still 50 packets in the circular queue, the corresponding data may be deleted in the circular queue.

Furthermore, the overlay recovery policy includes a push method and a pull method. When the value of the recovery policy field (Recovery-by) indicating the overlay recovery policy is "Push", data recovery is performed only through the newly recovered primary path. The push method is used when real-time data is important, when the frequency of occurrence of data is not large, and when the size of data is not large. The importance of real time may be indicated in the data, and through this, it can be determined whether the data is important. in real time. In addition, threshold values for the frequency of occurrence of data and the size of data may be respectively set. Accordingly, it may be determined whether the frequency of occurrence of data is large through comparison with threshold value for the frequency of occurrence of data, and it may be determined whether the data is large through comparison with a threshold value for the size of the data.

When the value of the Recovery-by is "full", data recovery is performed using both the newly recovered primary path and the candidate paths. In the pull method, newly generated data is transferred to the primary path as the existing method, and only the data to be used for recovery uses the candidate paths. The pull method can be usefully used when real-time data is not important and when the size of data is large.

Figure 4:
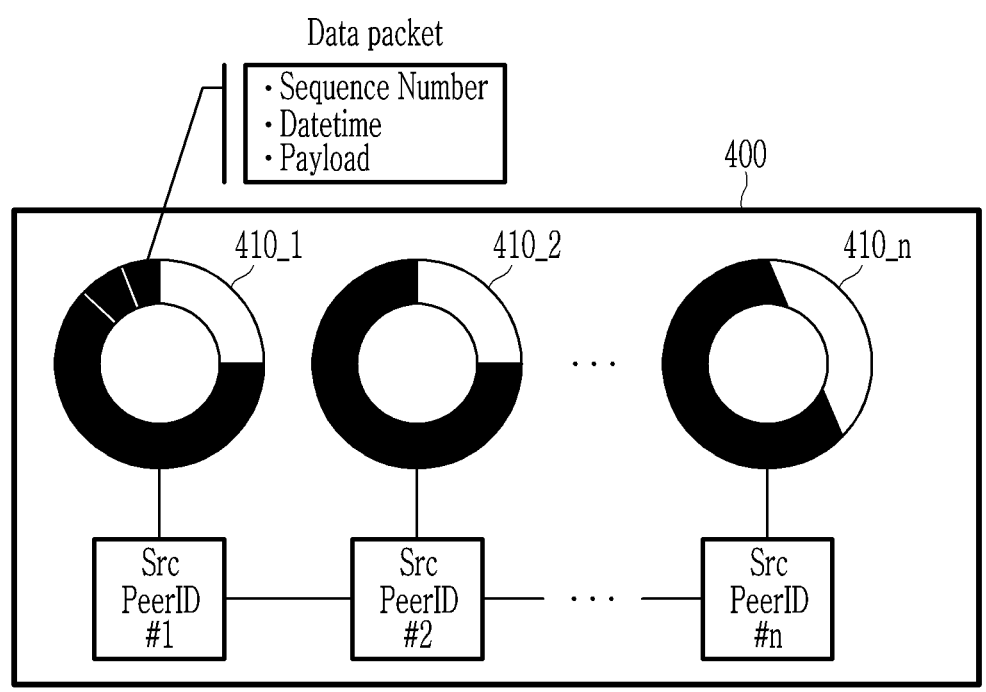
FIG. 4 is a diagram illustrating a caching buffer of a peer according to an embodiment of the present invention.

FIG. 4 is a diagram illustrating a caching buffer of a peer according to an embodiment of the present invention.

Referring to FIG. 4, in order to recover missing data in a multi-source hybrid overlay network, each peer needs to store a certain amount of data or more in a cache buffer.

All peers manage a caching buffer list 400 consisting of a set of caching buffers 410_1 to 410_n having the form of a circular queue. Each of the caching buffers 410_1 to 410_n includes a source peer identifier of Src PeerID #1 to Src PeerID #n and a data packet. The data packet includes a sequence number, a date and time, and a payload. The sequence number is increased by 1 each time the source peer generates data and transmits data. The date and time indicate a network time protocol (NTP) time when this data is generated. The payload includes data. The caching buffers 410_1 to 410_n are sequentially deleted from the oldest packet when a certain number (or a certain size) or more is accumulated in the process of storing data packets. In addition, if the value of the date and time exceeds the value of the mD_Cache, the data packet is deleted.

Figure 5:
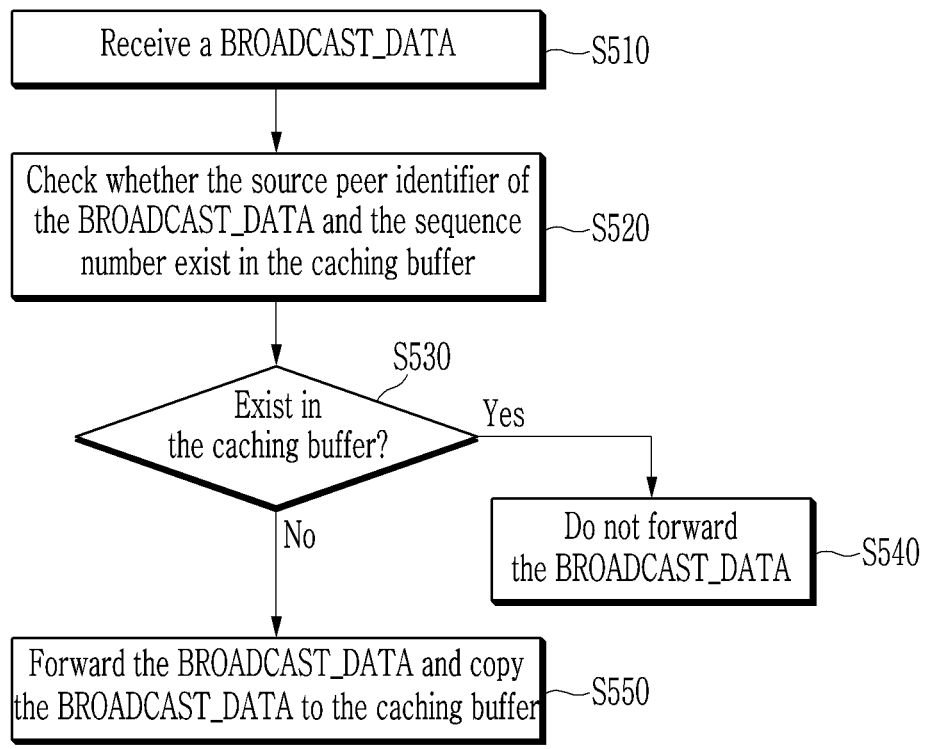
FIG. 5 is a flowchart illustrating a method of transmitting and receiving data by a peer according to an embodiment of the present invention.

FIG. 5 is a flowchart illustrating a method of transmitting and receiving data by a peer according to an embodiment of the present invention.

Referring to FIG. 5, when a peer receives a data message BROADCAST_DATA from another primary peer through a primary path (S510), it checks whether the source peer identifier of the received data message BROADCAST_DATA and the sequence number of the data packet exist in the caching buffer (S520).

If the source peer identifier of the received data message BROADCAST_DATA and the sequence number of the data packet exist in the caching buffer (S530), the peer determines that the received data message BROADCAST_DATA is a data message already received from another peer, and does not forward the data message BROADCAST_DATA to another primary path (S540).

Meanwhile, if the source peer identifier of the received data message BROADCAST_DATA and the sequence number of the data packet do not exist in the caching buffer (S530), the peer forwards the received data message BROADCAST_DATA to another primary path and copies it to the caching buffer (S550). The peer receives the value of the mD_Cache according to the overlay caching policy from the HOMS when joining the overlay network. Thus, the peer records the time obtained by adding the value of the mD_Cache to the current NTP time when storing the received data packet in the caching buffer, and maintains the data packet until that time in the caching buffer.

In this way, when the peer receives a data message BROADCAST_DATA from the primary path, it forwards the data message BROADCAST_DATA to another primary path and stores it in the cache buffer for a certain period.

Next, a data recovery operation in which the value of the recovery-by is "push" will be described in detail with reference to FIG. 6.

Figure 6:
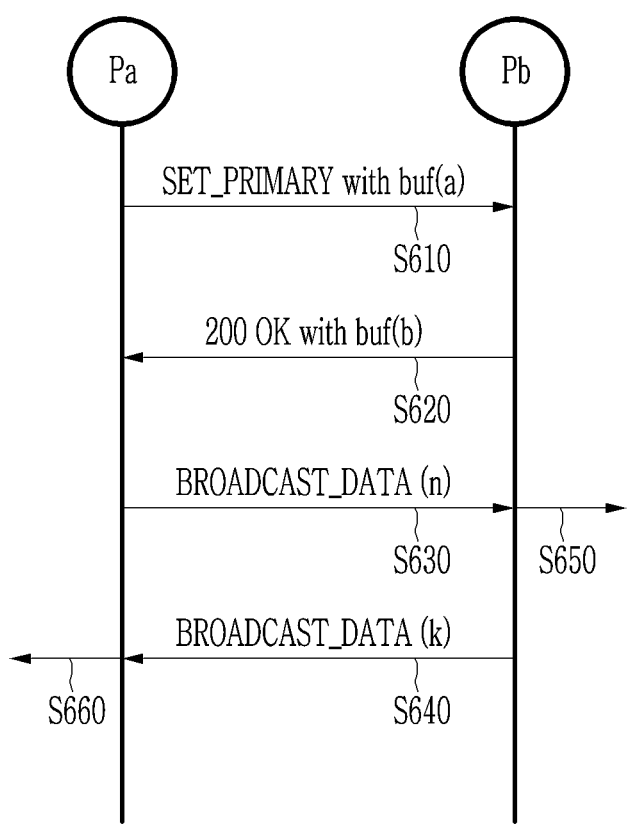
FIG. 6 is a diagram illustrating a missing data recovery procedure of a push method according to tree recovery according to an embodiment of the present invention.

FIG. 6 is a diagram illustrating a missing data recovery procedure of a push method according to tree recovery according to an embodiment of the present invention.

Referring to FIG. 6, when a primary path established by a peer Pa is disconnected, and then the peer Pa establishes a new primary path with a new peer Pb through a tree recovery process, the data recovery operation is performed.

The peer Pa transmits a primary path setting message SET_PRIMARY including buffer map Buf(a) of the peer Pa to peer Pb for tree recovery (S610). The primary path setting message SET_PRIMARY is a message sent to switch the candidate path to the primary path, and the tree is recovered only after this switching process is completed. The peer Pa connects through a plurality of candidate paths and primary paths with each of a plurality of other peers. At this time, if one primary path is disconnected, one of the plurality of candidate paths is switched to the primary path. In this process, in order to prevent a loop, it is determined whether the primary path setting message SET_PRIMARY should be transmitted through the value of the ticket-id. For example, if the value of the ticket-id of the peer Pa is 20, the value of the ticket-id of the peer Pn is 10, and the primary path between the peer Pa and the peer Pn is disconnected, the peer Pa proceeds with the recovery procedure, and the peer Pn does not proceed with the recovery procedure. In addition, the peer Pa selects one of candidate paths, and transmits a primary path setting message SET_PRIMARY through the selected path.

At this time, the peer Pa includes 'cache-recovery=true' in the primary path setting message SET_PRIMARY and transmits the primary path setting message SET_PRIMARY. That is, the peer Pa notifies that its own buffer map Buf(a) is included in the primary path setting message SET_PRIMARY), and requests the other peer to exchange buffer maps by transmitting the primary path setting message SET_PRIMARY including the 'cache-recovery=true'.

Upon receiving the primary path setting message SET_PRIMARY, the peer Pb transmits a response message 200 OK including a buffer map Buf(b) of the peer Pb (S620). If there is no value of 'cache-recovery=true' in the primary path setting message SET_PRIMARY, the peer Pb does not perform the rest of the process including comparison of the buffer map with the peer Pa.

The peer Pa compares its own buffer map Buf(a) with the buffer map Buf(b) of the peer Pb, and transmits data that the peer Pb does not have through a data message BROADCAST_DATA(n) (S630). Furthermore, the peer Pb compares its own buffer map Buf(b) with the buffer map Buf(a) of the peer Pa, and transmits data that the peer Pa does not have through a data message BROADCAST_DATA(k) (S640).

The peer Pb delivers the received data message BROADCAST_DATA(n) to other peers in the conventional manner (S650), and the peer Pa delivers the received data message BROADCAST_DATA(k) to other peers in the conventional manner (S660).

These processes S610 to S660 will be described in detail with reference to FIG. 7.

Figure 7:
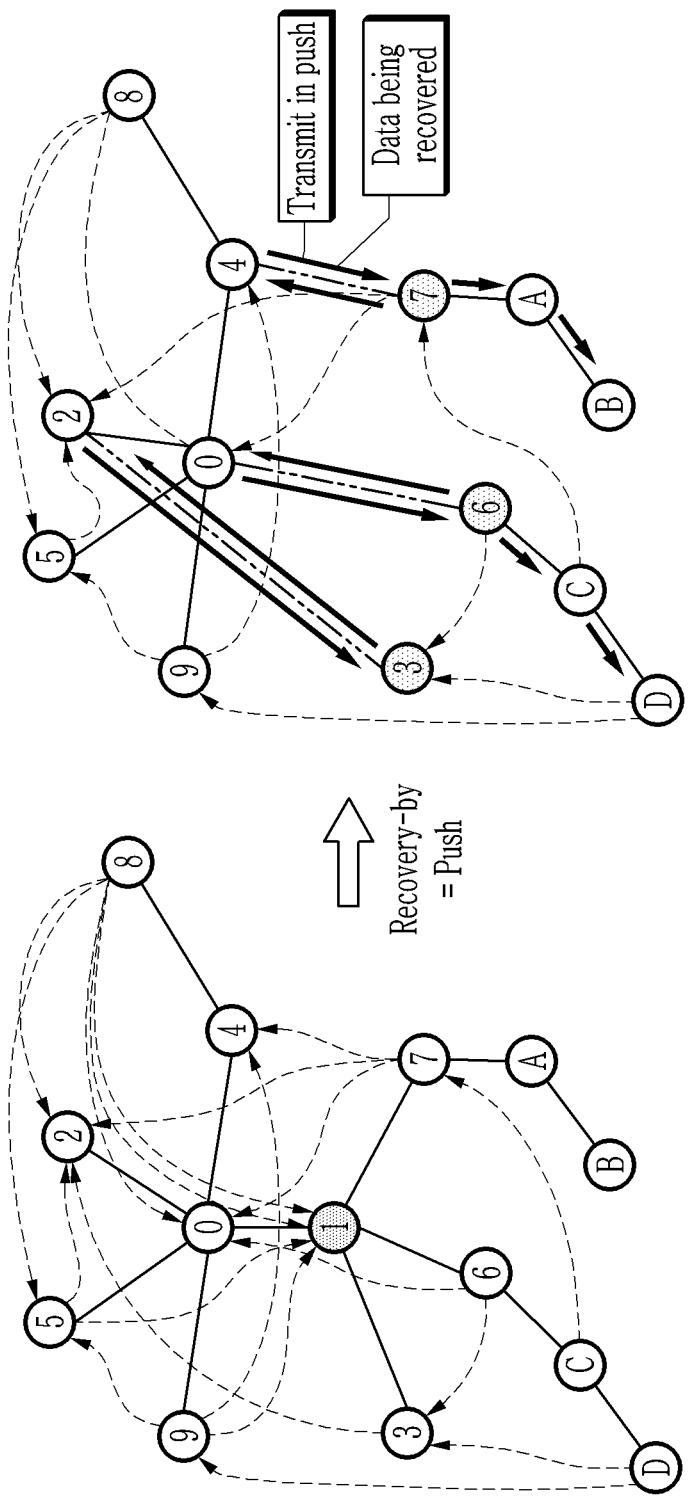
FIG. 7 is a diagram illustrating an example of data recovery using a push method according to an embodiment of the present invention.

FIG. 7 is a diagram illustrating an example of data recovery using a push method according to an embodiment of the present invention.

Referring to FIG. 7, when the peer 1 disappears, the peers 0, 3, 6, and 7 connected to the peer 1 by a primary path proceed with a tree recovery procedure. At this time, since peer 0 has a lower ticket-id than peer 1, a recovery operation is performed, and peers 3, 6, and 7 having a higher ticket-id than peer 1 perform the tree recovery operation. For example, each of peers 3, 6, and 7 switches one of the candidate paths into the primary path through the primary path setting message SET_PRIMARY. In this process, each of the peers 3, 6, and 7 includes their own buffer map of Buf(3), Buf(6), and Buf(7) and 'cache-recovery=true' in the primary path setting message SET_PRIMARY, and transmits the primary path setting message SET_PRIMARY.

Each of the peers 2, 0, and 4 that have received the primary path setting message SET_PRIMARY from peers 3, 6, and 7 compares the received buffer map of Buf(3), Buf(6), and Buf(7) and its own buffer map of Buf(2), Buf(0), and Buf(4), and transmits data that each of the counterpart peers 3, 6, and 7 do not have to counterpart peers 3, 6, and 7. In addition, each of peers 3, 6, and 7 also compares buffer maps of Buf(3), Buf(6), and Buf(7) and received buffer maps of Buf(2), Buf(0), and Buf(4), and transmits data that each of the counterpart peers 2, 0, and 4 do not have to counterpart peers 2, 0, and 4. In this way, in the data recovery method of the push method, the peer transmits its own buffer map to the counterpart peer to receive data that the peer does not have from the counterpart peer.

The peers 6 and 7 deliver the received data to other peers C and A that are connected through the primary paths, respectively, and peers C and A also deliver the received data to other peers D and B that are connected through the primary paths, respectively. In addition, the peers 3, 6, and 7 transmit data newly generated in a segment including the peer 3, a segment including the peers 6, C, and D, and a segment including the peers 7, A, and B to peers 2, 0, and 4 through the primary paths established from the tree recovery, respectively. The peers 2, 0, and 4 also transmit the received data to other peers 5, 9, and 8 that are connected through the primary paths, respectively. Through this process, the synchronization of data between segments caused by the tree disconnection is completed.

Next, a data recovery operation in which the value of the recovery-by is "full" will be described in detail with reference to FIG. 8.

Figure 8:
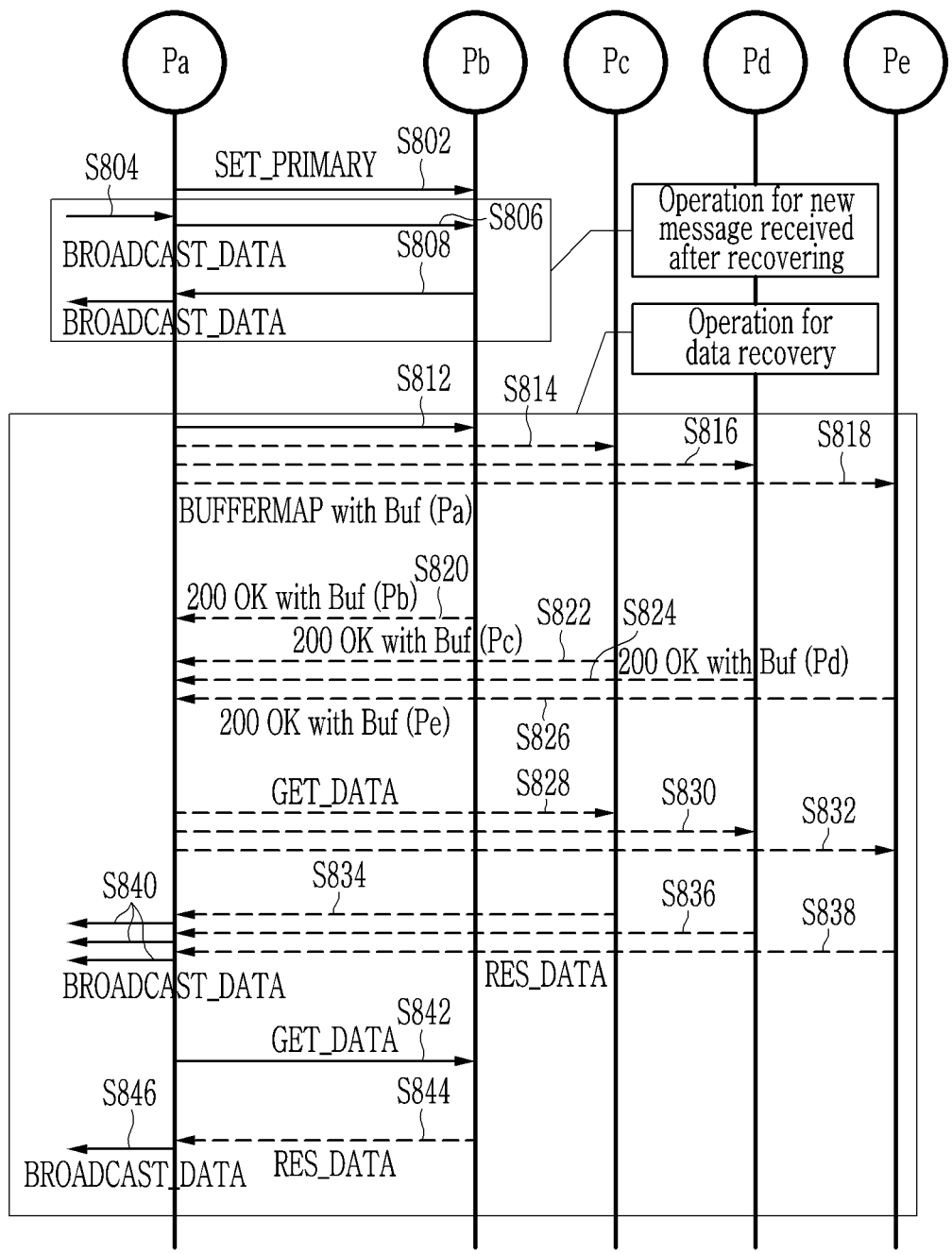
FIG. 8 is a diagram illustrating a missing data recovery procedure of a pull method according to tree recovery according to an embodiment of the present invention.

FIG. 8 is a diagram illustrating a missing data recovery procedure of a pull method according to tree recovery according to an embodiment of the present invention.

Referring to FIG. 8, when a primary path established by a peer Pa is disconnected, and then the peer Pa establishes a new primary path with a new peer Pb through a tree recovery process, the data recovery operation of the pull method is performed. When the tree is recovered, the peer with the higher ticket-id value sends its data to the peer with the lower ticket-id using a push method, and gets the data that the peer do not have from the peer with the lower ticket-id using a pull method. Due to the characteristics of hybrid P2P, a ticket-id of any one peer is set to be higher than ticket-ids of peers connected by a primary path and candidate paths. That is, any one peer is allocated a ticket-id while joining the overlay network. In this case, the allocated ticket-id is allocated higher than the ticket-ids of peers to which the any one peer will be connected through the primary path and the candidate paths in the overlay network. HOMS allocates ticket-id according to the order in which each peer joins the overlay network.

First, a method for recovering data of a pull method by a peer with a high ticket-id will be described.

The peer Pa with a high ticket-id performs tree recovery by transmitting the primary path setting message SET_PRIMATY to the peer Pb (S802). In this case, the peer Pa does not include its own buffer map in the primary path setting message SET_PRIMATY.

The peer Pa processes the newly received data message BROADCAST_DATA after the tree is recovered. Specifically, the peer Pa forwards the new data message BROADCAST_DATA received from the other peer to the peer Pb (S804, S806). Furthermore, when new data is also generated, the peer Pb transmits a data message BROADCAST_DATA including new data to the peer Pa (S808). The peer Pa transfers the data message BROADCAST_DATA received from the peer Pb to another peer connected through the primary path (S810).

Next, the peer Pa performs an operation for data recovery. The peer Pa transmits a buffer map message BUFFERMAP including its own buffer map Buf(Pa) through both the newly recovered primary path and the candidate paths (S812 to S818).

Each of the peers Pb, Pc, Pd, and Pe receiving the buffer map message BUFFERMAP transmits a response message 200 OK including its own buffer map of Buf(Pb), Buf(Pc), Buf(Pd), and Buf(Pe) to the peer Pa (S820 to S826).

The peer Pa checks the buffer map Buf (Pb) received from the peer Pb connected through the primary path, when there is no data that the peer Pa has in the buffer map Buf (Pb), the peer Pa may transmit a data message BROADCAST_DATA including corresponding data. That is, since the value of the ticket-id of the peer Pb is lower than the value of the ticket-id of the peer Pa, the peer Pa transmits data that the peer Pb does not have in a push method to the peer Pb.

In addition, the peer Pa gets data that the peer Pa does not have from peers Pc, Pd, and Pe with higher ticket-ids than the value of the ticket-id of the peer Pa in a pull method. Specifically, the peer Pa transmits a data request message GET_DATA to peers Pc, Pd, and Pe connected through a candidate path first, to request data that the peer Pa does not have to peers Pc, Pd, and Pe (S828, S830, and S832). Each of peers Pc, Pd, and Pe compares the buffer map Buf(Pa) of the peer Pa with their own buffer map of Buf(Pc), Buf(Pd), and Buf(Pe), and transmits a response data message RES_DATA including data that does not exist in the buffer map Buf(Pa) to the peer Pa (S834, S836, and S838).

When the peer Pa receives data that the peer Pa does not have through the response data message RES_DATA from peers Pc, Pd, and Pe (S834, S836, and S838), it transmits a data message BROADCAST_DATA including the received data to other peers connected through the primary path (S840).

When there is data that is not acquired from peers Pc, Pd, and Pe connected through the candidate path, the peer Pa transmits a data request message GET_DATA to peer Pb connected to the primary path to request the remaining data (S842).

When the peer Pa receives data that peer Pa does not have through the response data message RES_DATA from peer Pb, it transmits a data message BROADCAST_DATA including the received data to other peers connected through the primary path (S844).

That is, the peer Pa compares the buffer map Buf(Pa) of the peer Pa and each of the buffer maps Buf(Pb), Buf(Pc), Buf(Pd), and Buf(Pe) received from all peers Pb, Pc, Pd, and Pe connected to the primary path and candidate paths, respectively, and requests data that the peer Pa does not have to the peers Pb, Pc, Pd, and Pe. At this time, since the primary path transmits and receives messages such as the data message BROADCAST_DATA, in order to reduce the processing burden of the primary path, when all peers Pb, Pc, Pd, and Pe have data that the peer Pa does not have, the peer Pa obtains data that the peer Pa does not have by first requesting the data to the peers Pc, Pd, and Pe connected through the candidate paths.

Before transmitting the data message BROADCAST_DATA to another peer connected through the primary path, the peer Pa determines whether the corresponding data exists in the buffer map Buf(Pa) of the peer Pa, and may transmit the data message BROADCAST_DATA including the corresponding data to the other peers when the corresponding data does not exists in the buffer map Buf(Pa). When any one peer exits the network, several primary paths associated with the any one peer are simultaneously recovered, and redundant data may be transmitted and received during this recovery process. Therefore, before transmitting the data message BROADCAST_DATA to another peer, the peer Pa determines whether the received data exists in the buffer map Buf(Pa) of the peer Pa, copies the received data in the buffer map Buf(Pa) when the received data does not exist in the buffer map Buf(Pa), and transmits the data message BROADCAST_DATA including the received data. The peer Pa does not transmit the data to other peers if there is corresponding data in the buffer map Buf(Pa) of the peer Pa.

These processes (S802 to S844) will be described in detail with reference to FIG. 9.

Figure 9:
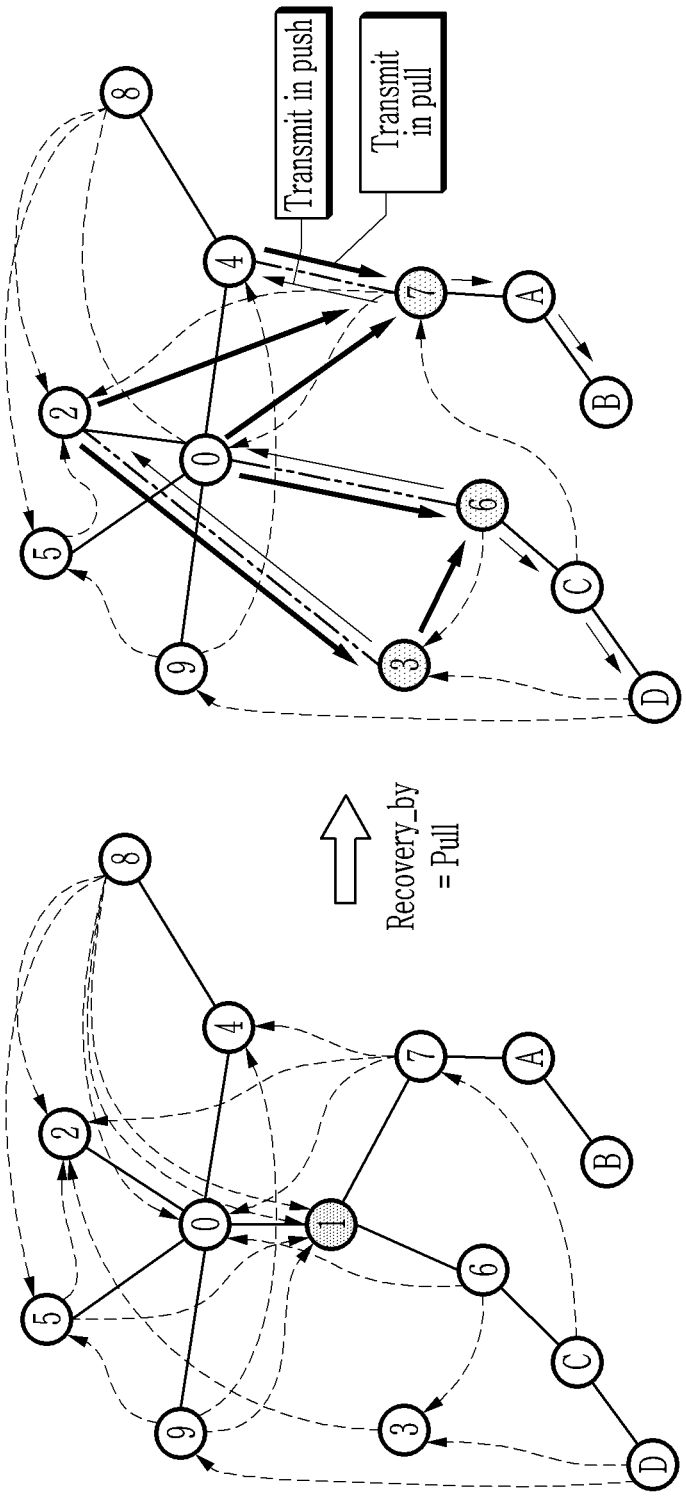
FIG. 9 is a diagram illustrating an example of data recovery in a pull method according to an embodiment of the present invention.

FIG. 9 is a diagram illustrating an example of data recovery in a pull method according to an embodiment of the present invention.

Referring to FIG. 9, when the peer 1 disappears, the peers 0, 3, 6, and 7 connected to the peer 1 through the primary paths, respectively, proceed with a tree recovery procedure. At this time, since peer 0 has a lower ticket-id than peer 1, it does not perform a recovery operation, and peers 3, 6, and 7 having a higher ticket-id than peer 1 perform the tree recovery operation. For example, each of peers 3, 6, and 7 switches one of the candidate paths into the primary path through the primary path setting message SET_PRIMARY. In this process, newly generated data in a segment including the peer 3, a segment including the peers 6, C, and D, and a segment including the peers 7, A, and B, respectively, are delivered to the entire segment through the peers 2, 0, and 4. In addition, the peers 3, 6, and 7 check data that they do not have by exchanging buffer maps with the peers 2, 0, and 4, and request the data that they do not have to another peers connected to the primary path and candidate paths in parallel. The data acquired in this way is delivered to other peers connected to the primary path.

Figure 10:
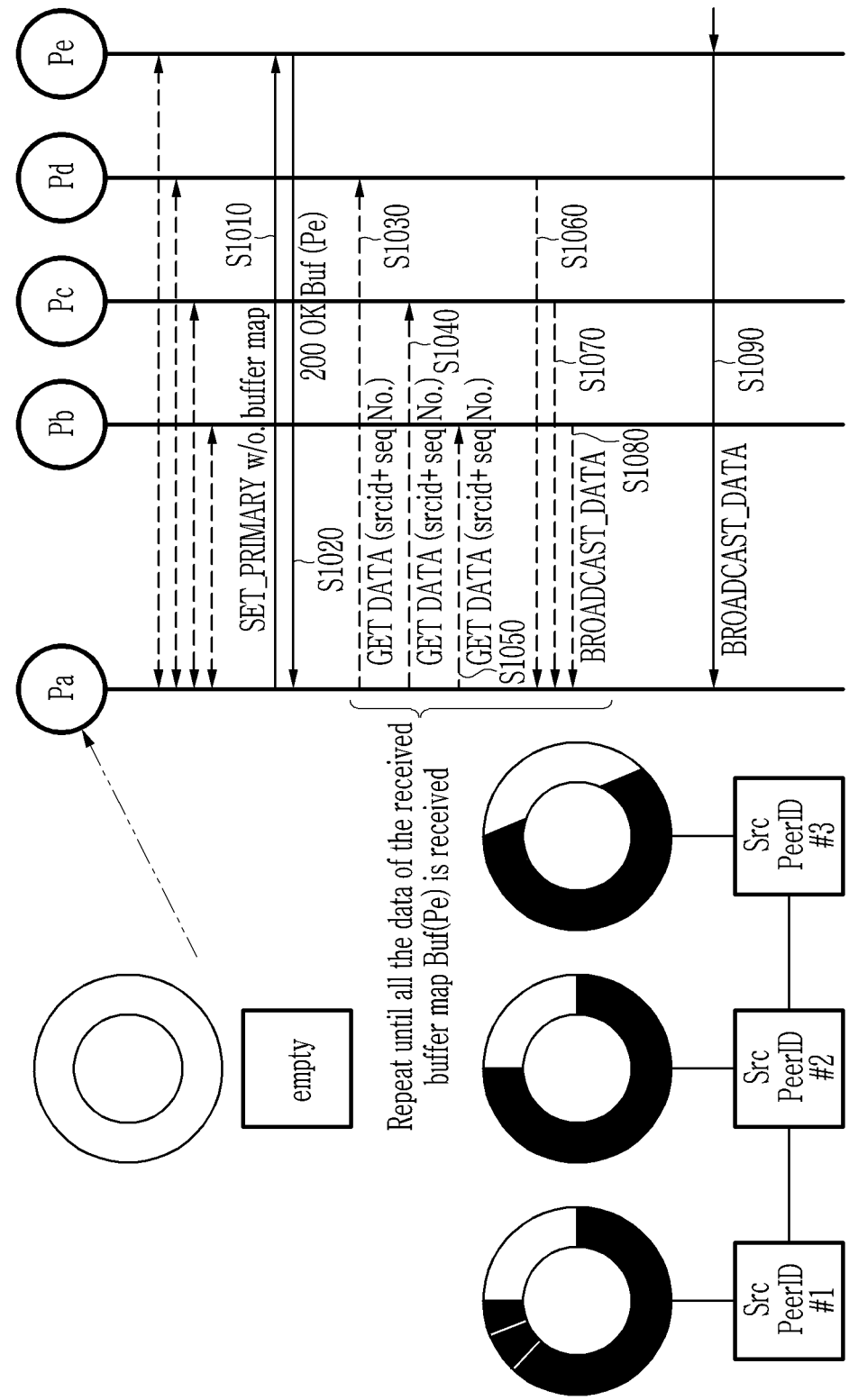
FIG. 10 is a diagram illustrating a procedure for a new peer to participate in a hybrid overlay network according to an embodiment of the present invention.

FIG. 10 is a diagram illustrating a procedure for a new peer to participate in a hybrid overlay network according to an embodiment of the present invention.

Referring to FIG. 10, a new peer Pa selects one peer Pe among a plurality of candidate peers, and transmits a primary path setting message SET_PRIMARY (S1010). In this case, the buffer map is not included in the primary path setting message SET_PRIMARY. That is, the new peer Pa selects one peer Pe among the plurality of candidate peers and switches the primary path.

Peer Pe transmits a response message 200 OK is response to the primary path setting message SET_PRIMARY to the new peer Pa (S1020). At this time, Peer Pe includes a buffer map Buf(Pe) of the peer Pe in the response message 200 OK.

The new peer Pa transmits a data request message GET_DATA to request data it needs to other candidate peers Pb, Pc, and Pd (S1030~S1050). In this case, the source peer identifier srcid and the sequence number seq No. of the data packet may be specified in the data request message GET_DATA.

The candidate peers Pb, Pc, and Pd transmit a data message BROADCAST_DATA including the requested data to the new peer Pa, respectively (S1060~S1080). At this time, the candidate peers Pb, Pc, and Pd transmit the data message BROADCAST_DATA in the same manner as a general broadcast data packet delivery process so that the new peer Pa can recognize that a normal data packet has been received.

The new peer Pa stores data received from the candidate peers Pb, Pc, and Pd in the cache buffer for each of source peer identifiers Src PeerID #1, Src PeerID #2, and Src PeerID #3. As described above, all peers participating in the multi-source hybrid overlay network can generate dada, and then broadcast the data. Therefore, for recovery, it is necessary to distinguish which source peer the packet is generated by, so the new peer Pa stores the received data in the cache buffer for each source peer identifier Src PeerID #1, Src PeerID #2, and Src PeerID #3.

The peer Pa may repeat the steps (S1030~S1080) until all the data of the received buffer map Buf(Pe) is received.

Peer Pa does not perform any further operation because there is no other lower peer.

Furthermore, the peer Pe transmits a data message BROADCAST_DATA to the peer Pa when the data message BROADCAST_DATA is received (S1090).

Figure 11:
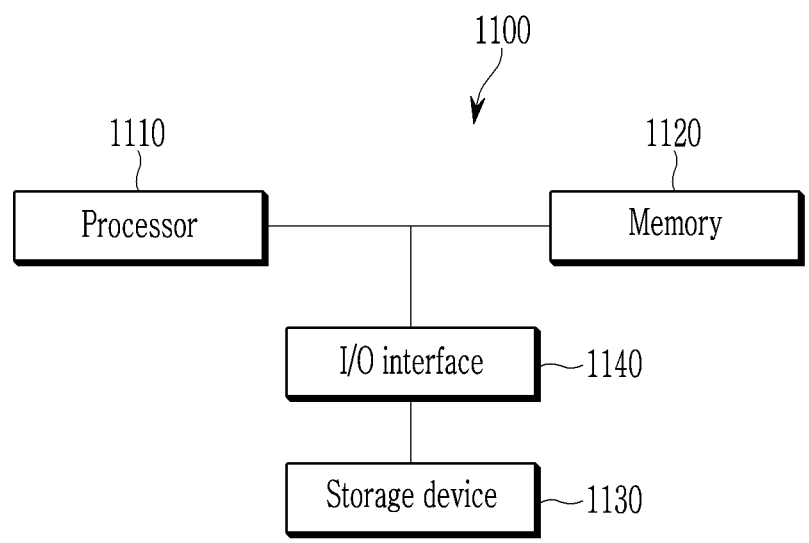
FIG. 11 is a diagram illustrating an apparatus for recovering missing data according to an embodiment of the present invention.

FIG. 11 is a diagram illustrating an apparatus for recovering missing data according to an embodiment of the present invention.

Referring to FIG. 11, an apparatus for recovering missing data 1100 includes a processor 1110, a memory 1120, a storage device 1130, and an input/output (I/O) interface 1140. The apparatus for recovering missing data 1100 may be implemented in a peer.

The processor 1110 may be implemented as a central processing unit (CPU), another chipset, or a microprocessor.

The memory 1120 may be implemented as a medium such as a random access memory (RAM), a dynamic random access memory (DRAM), a rambus DRAM (RDRAM), a synchronous DRAM (SDRAM), a static RAM (SRAM), etc.

The storage device 1130 may be implemented as a hard disk, optical disks such as a compact disk read only memory (CD-ROM), a CD rewritable (CD-RW), a digital video disk ROM (DVD-ROM), a DVD-RAM, a DVD-RW disk, Blu-ray disks, etc., a flash memory, or permanent or volatile storage devices such as various types of RAM. The storage device 1130 may include a cache buffer.

The I/O interface 1140 allows the processor 1110 and/or the memory 1120 to access the storage device 1130.

The processor 1110 may perform the missing data recovery function described with reference to FIGS. 1 to 10, and load program commands for implementing the missing data recovery function into the memory 1120, and may control to perform the operation described with reference to FIGS. 1 to 10. These program commands may be stored in the storage device 1130 or may be stored in another system connected through a network.

According to an embodiment of the present invention, data synchronization between segments generated in a process of recovering a tree serving as a backbone network in a hybrid P2P network becomes possible. In addition, the embodiment of the present invention includes a method for preventing the size of the cache from becoming too large, so that the performance of the entire network can be prevented from deteriorating due to the cache. It is impossible to provide this function without using additional recovery channels in existing one-way single source overlay network based on a tree.

Furthermore, in the existing multi-source hybrid P2P network, the candidate paths are used only as backup channels for recovery according to failure of the primary path. However, in the embodiment of the present invention, data can be recovered using the candidate paths. Accordingly, the utilization of the candidate paths can be widened, and due to this, even a large amount of data can be recovered in a faster time.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (08) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A method for recovering missing data occurring in a tree recovery process by a first peer in a multi-source hybrid overlay network including a plurality of peers, the method comprising:
 receiving a data recovery policy of a push method;
 transmitting a buffer map of the first peer to a second peer for tree recovery;
 receiving a buffer map of the second peer from the second peer;

comparing the buffer map of the first peer and the buffer map of the second peer; and transmitting a first broadcast message including data that the second peer does not have to the second peer.

2. The method of claim 1, further comprising receiving a second broadcast message including data that the first peer does not have from the second peer.

3. The method of claim 2, further comprising transmitting the second broadcast message to another third peer connected through a primary path.

4. The method of claim 2, wherein the receiving the second broadcast message includes copying data received through the second broadcast message to a cache buffer of the first peer, the cache buffer has the form of a circular queue for each source peer identifier, and the copying includes storing the received data in a queue corresponding to a source peer identifier of the received data.

5. The method of claim 1, wherein the transmitting of the buffer map of the first peer includes:

selecting one of a plurality of candidate paths; and transmitting a primary path setting message for switching the selected candidate path to a primary path to the second peer to establish the primary path with the second peer, and the primary path setting message includes the buffer map of the first peer.

6. A method for recovering missing data occurring in a tree recovery process by a first peer in a multi-source hybrid overlay network including a plurality of peers, the method comprising:

selecting one of a plurality of candidate paths, and transmitting a primary path setting message for switching the selected candidate path to a primary path to a second peer to establish the primary path with the second peer;

transmitting data that the second peer does not have to the second peer in a push method; and acquiring data that the first peer does not have from at least one peer among the second peer and at least one third peer connected to the first peer through a candidate path in a pull method.

7. The method of claim 6, wherein the acquiring data includes:

transmitting a buffer map of the first peer to the second peer and the at least one third peer;

receiving buffer maps of the second peer and the at least one third peer from the second peer and the at least one third peer; and requesting and receiving data that the first peer does not have to at least one peer among the second peer and at least one third peer by comparing the buffer map of the first peer with the buffer maps of the second peer and the at least one third peer.

8. The method of claim 7, wherein the requesting and receiving includes:

first requesting and receiving data that the first peer does not have to the at least one third peer among the second peer and the at least one third peer; and requesting and receiving data not acquired from the at least one third peer among data that the first peer does not have to the second peer.

9. The method of claim 7, further comprising:

when data that the first peer does not have is received, checking whether the received data exists in the buffer map of the first peer; and when the received data does not exist in the buffer map of the first peer, transmitting a broadcast message including the received data to another peer connected through a primary path.

10. The method of claim 9, wherein the transmitting of the broadcast message includes storing the received data in a cache buffer formed as a circular queue for each source peer identifier in response to the source peer identifier of the received data.

11. The method of claim 6, wherein the establishing includes:

when new data is received after the tree recovery, transmitting a first broadcast message including the new data to the second peer; and when a second broadcast message including new data is received from the second peer, transmitting the second broadcast message to another peer connected through a primary path.

12. The method of claim 11, further comprising storing the received new data in a cache buffer formed as a circular queue for each source peer identifier in response to the source peer identifier of the received new data.

13. An apparatus for recovering missing data occurring in a tree recovery process by a peer in a multi-source hybrid overlay network including a plurality of peers, the apparatus comprising:

an interface for transmitting and receiving data; and a processor that is connected to the interface, acquires data that the peer does not have in a pull method through exchanging buffer maps with a first counterpart peer connected to a primary path recovered in the tree recovery process and at least one second counterpart peer connected to at least one candidate path, and provides data that the first counterpart peer does not have to the first counterpart peer in the push method, when a data recovery policy is a pull method.

14. The apparatus of claim 13, wherein when the data recovery policy is a push method, the processor provides data that the first counterpart peer does not have through a comparison of its own buffer map and the buffer map of the first counterpart peer to the first counterpart peer, and receives data that the peer does not have from the first counterpart peer.

15. The apparatus of claim 13, further comprising:

a cache buffer that stores data, wherein the processor transmits the acquired data to another peer connected through another primary path and stores the acquired data in the cache buffer when the acquired data does not exist in the cache buffer.

16. The apparatus of claim 15, wherein the cache buffer is in the form of a circular queue for each source peer identifier, and the processor stores the acquired data in a queue corresponding to a source peer identifier of the acquired data.

17. The apparatus of claim 16, wherein the cache buffer sequentially deletes from the oldest data when data larger than a predetermined size is stored, and deletes data whose minimum maintain time has elapsed among stored data.

18. The apparatus of claim 13, wherein the processor first requests and acquires data that the peer does not have from the at least one second counterpart peer, and requests and acquires data that is not acquired from the second counterpart peer among the data that the peer does not have to the first counterpart peer.

* * * * *